Patented July 12, 1932

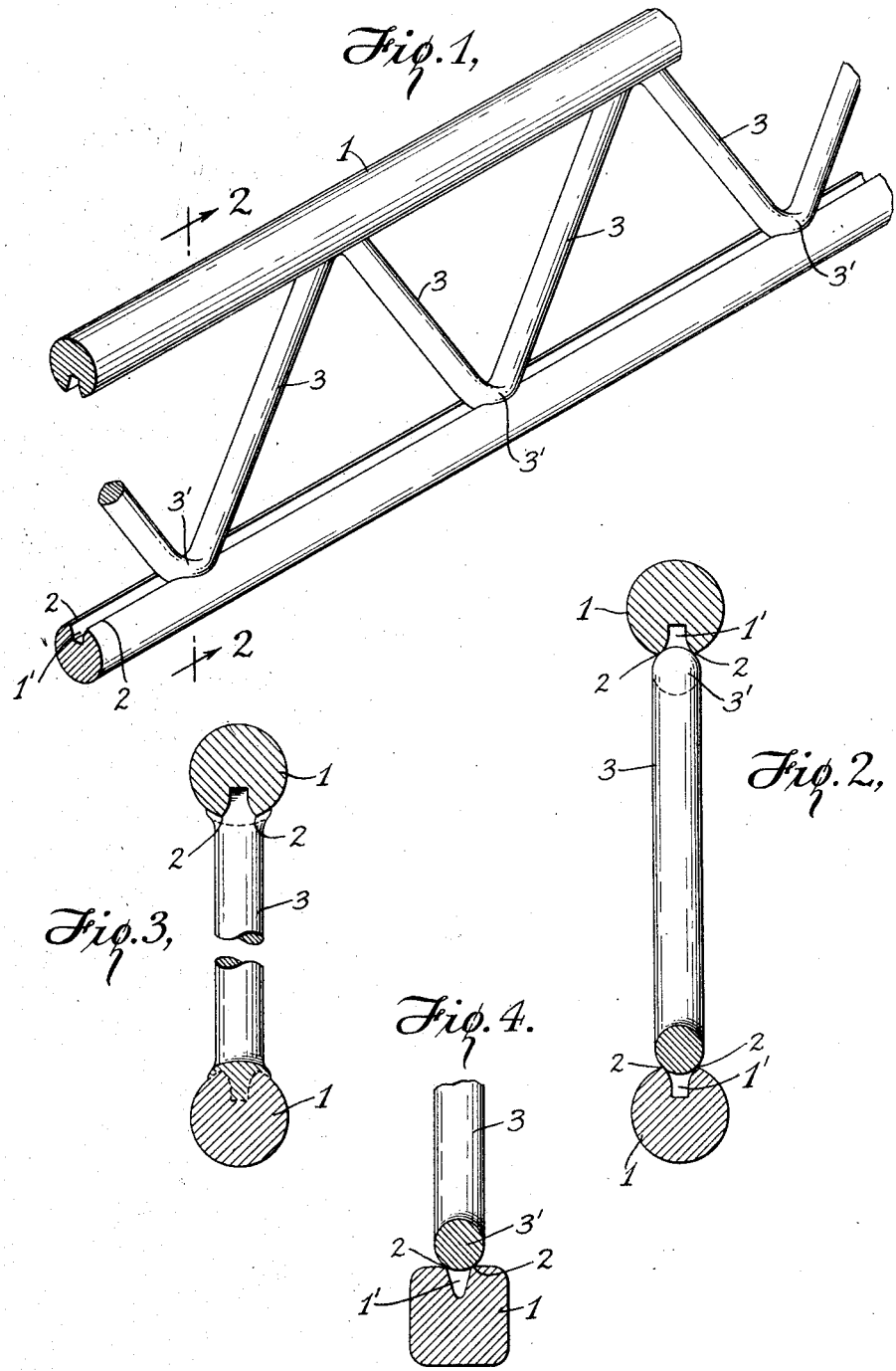

1,866,584

UNITED STATES PATENT OFFICE

LORILLARD SPENCER, OF NEW YORK, N. Y.

COMPOSITE METAL WORK

Application filed April 6, 1928. Serial No. 268,042.

My invention relates to composite or fabricated electrically welded metal work and more particularly to constructions such as skeleton or open work girders, grilles, metal reinforcements and so forth wherein a longitudinal or main supporting member has another element projecting from it to provide the diagonals or braces of a girder or girder like reinforcement or to furnish the open work portions of a grille or grating.

The object of the invention is to permit the use of ordinary forms of commercial bar or rod in the production of an electrically welded structure wherein the diagonals or members projecting from the longitudinal or base are firmly secured to the latter by a union whose strength depends both upon the mechanical interlocking of the parts and the electrical welding of them together.

A further object of the invention is to permit the use of ordinary commercial rods or bars preferably of rounded form in section for the longitudinal element of a structure having the general characteristics or form above described. To these ends my invention consists in the composite electrically welded metal construction hereinafter described and then specified in the claims.

As the invention is particularly useful for a reinforcement of girder like form or for other devices of similar form as for instance for grilles or gratings it will be described as applied to what may be conveniently called a girder.

In the accompanying drawing:

Fig. 1 illustrates in perspective a construction embodying my invention.

Fig. 2 is a vertical cross-section through the parts at the location of the joint between them showing them as assembled for welding.

Fig. 3 is a cross-section through the welded joint.

Fig. 4 illustrates in cross-section a slightly different form of rod that can be used for the longitudinal member of the structure.

1 indicates the longitudinal main supporting or compression member of the structure illustrated as of girder form. Said element 1 consists of a suitable length of metal rod which is shown in cross section as the ordinary commercial round form. Said element 1 is provided with a longitudinal groove 1' on the inside or side from which the other element 3 of the composite metal structure projects. Said groove 1' may be formed in the rolling or process of manufacturing the rod 1 or may be formed therein afterward and in such way as to provide a groove having edges indicated at 2 adapted to be engaged by the round of the rod forming the element 3 which is welded to 1. Element 3 in the case of a girder form of construction is preferably bent up into zig-zag form from a round bar or rod and provides diagonals or converging elements which converge or meet in a bend at 3'. The angle or apex 3' formed by such converging elements is adapted to engage and partially enter the groove in the element 1 as indicated in Fig. 2.

The circumference of the round of the rod 3 crosses the longitudinal edges 2 of the groove in 1 and provides in effect by the crossing contacts, limited areas of initial electrical welding contact at which the electrical heating starts on the application of the welding current. When the parts are assembled as indicated and a suitably formed welding electrode fitting into the inner angle of the converging elements 3 is applied to force the bend or apex down into the groove an electrical weld and union of the two elements ensues such as shown in Fig. 3. This weld results from the spreading of the area of heating and softening under the pressure of the electrode and effect of the current and the consequent enlargement of the area or extent of fused metal so that the bend or apex is forced down by the pressure into the groove and at the same time a weld is effected of the general form shown. This weld may embrace an enlarged section of fused metal indicated at 5 which is crowded over upon the side of the element 1 by the action of the welding electrode and forms an additional stay or brace which will resist twisting or torsion of the element 3 in a direction transverse to the plane of the bending. This enlarged joint likewise strengthens the union in which the electric weld is reinforced by the mechanical interlocking of the bend of the element 3 with the sides of the groove 1' into which it is forced in the electric welding process. The limited amount of material in the rod 1 at portions thereof contiguous to the welded edges of the groove assists in the welding operation since it limits the extent of the cooling mass through which heat at the point of weld may be dissipated. There being a longitudinal practically continuous groove in the element 1 it is obvious that in the operation of welding the parts together it is not necessary to locate the bends or apices of the converging elements 3 at any particular point along said groove. The operation of manufacturing the same is accordingly facilitated.

Fig. 4 shows my invention as carried out in connection with a grooved rod of slightly different form in cross section.

What I claim as my invention is:

1. A skeleton girder or the like the longitudinal of which consists of a grooved rod while the strut or brace portions consist of sections of a bent rod in whose bends said sections unite, the bend being initially of greater thickness than the width of said groove and seated and welded to the edges of the groove of the longitudinal member.

2. An electrically welded girder or the like the longitudinals of which consist of rods formed with relatively narrow grooves while the strut or brace portion consists of a zig-zag rod of a size which prevents the same initially from passing to the bottom of said groove, said zig-zag rod being seated and welded at its bends to said longitudinal rods within and without said grooves.

Signed at New York, in the county of New York and State of New York, this 31st day of March, A. D. 1928.

LORILLARD SPENCER.